June 16, 1959   G. B. GORDON   2,890,546
FLOWER HOLDER
Filed Jan. 6, 1958

INVENTOR.
GEORGE B. GORDON
BY
Lynn H. Latta
ATTORNEY

United States Patent Office 2,890,546
Patented June 16, 1959

2,890,546

FLOWER HOLDER

George B. Gordon, Santa Rosa, Calif.

Application January 6, 1958, Serial No. 707,395

4 Claims. (Cl. 47—41)

This invention relates to holders for cut flowers and has as its object to provide a holder especially adapted for supporting an arrangement of flowers in a dry spray such as is used in connection with funerals, weddings, etc.

A particular object of the invention is to provide a relatively inexpensive holder, which, even though allowed to be visible in a floral display, will not be objectionable in appearance, and which, therefore, may be used without a covering container.

The invention also contemplates a holder which, if desired, can be immersed in water in a suitable container while holding a spray of flowers with their stems dipping into the water.

Another object is to provide a flower holder into which the stems of flowers may be inserted at any selected location. More specifically, the invention contemplates a holder embodying a covering skin of thin, frangible sheet material which can easily be pierced by the stems of the flowers at any selected series of points throughout the entire area of the holder above the base thereof (i.e. top, sides and ends).

A further object is to provide a holder having a readily pierceable skeleton structure which is form-retaining and defines the contours of the holder, together with a core body that is likewise readily pierceable by the flower stems and adapted to engage and support the stems in any plurality of selected positions and inclination with reference to the holder.

Other objects and advantages will become apparent in the ensuing specification and appended drawing in which.

Figure 1:
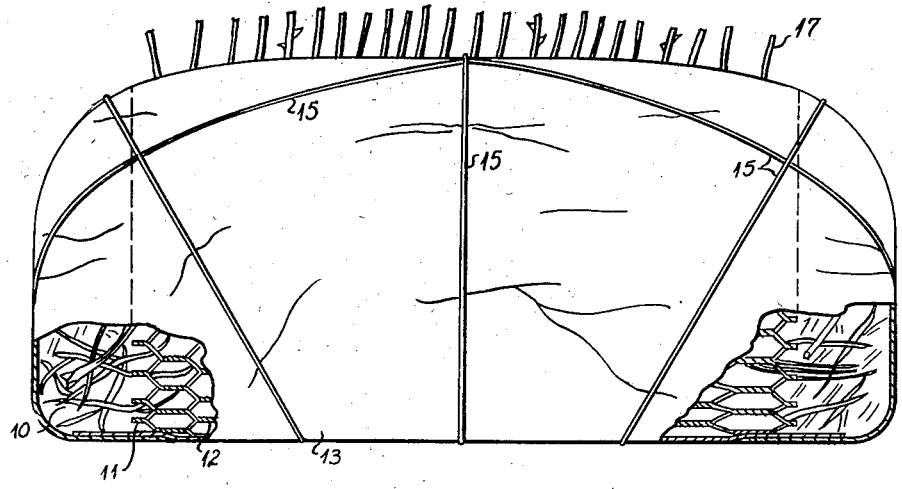
Fig. 1 is a side elevational view of a flower holder embodying my invention with portions of the skin thereof broken away to illustrate the internal construction.
Figure 2:
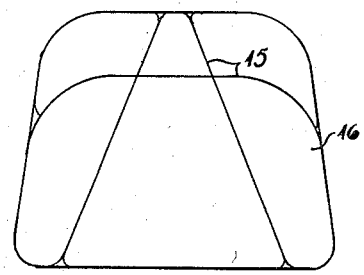
Fig. 2 is an end view of the same.

Referring now to the drawing in detail, I have shown therein, as an example of one form in which the invention may be embodied, a flower holder embodying a loaf shaped core body comprising a loosely matted mass of dried needles from an evergreeen tree such as pine, fir, spruce, etc., indicated at 10; a skeleton structure 11 of woven wire defining the lateral, top and bottom contours of the holder; a skin 13 of readily pierceable material such as tissue paper, preferably colored green to match the color of the flower stems; a bottom panel 14, upon which the skeleton 11 and the mass of needles 10 rests, and a binding 15 of fine copper or aluminum or galvanized wire wound around the skin 13 and the bottom panel 14 and securing them in assembly.

Figure 3:
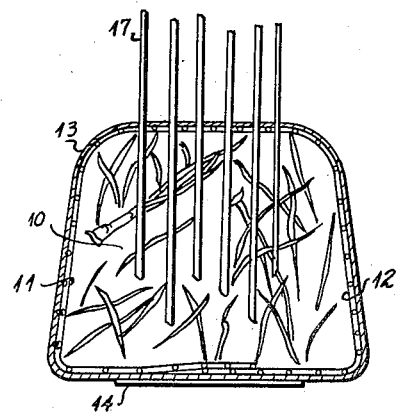
Fig. 3 is a transverse sectional view of the same.
Figure 4:
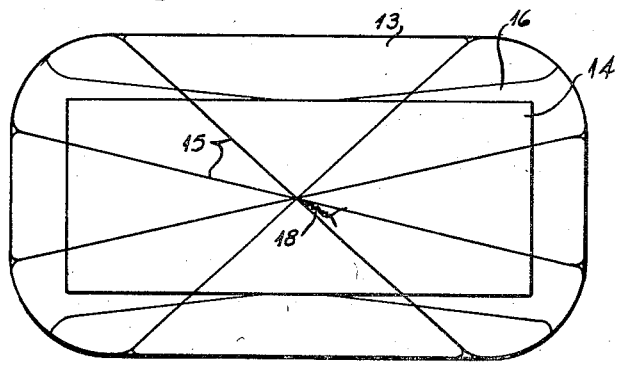
Fig. 4 is an inverted plan view of the same.

The pine needles 10 are fairly dry prior to being fabricated into the holder. The skeleton 11 is constructed from a strip of woven wire mesh (e.g. "chicken wire") having a width somewhat less than the overall length of the holder, the strip of wire being rolled into the form of a tube around a suitable mandrel, and appropriately bent to form corners adjoining the over-lapping bottom portions thereof which are left flat to provide the flat base portion of the skeleton as indicated in Fig. 3. The intermediate portion of the strip is arched to any selected cross section such as the flattened arch indicated in Fig. 3. After the skeleton has been formed to the selected cross section, it may be opened up to receive the mass of needles 11 which are pre-molded to approximately the selected cross section of the holder and are then shaped to the final cross section by the confining action of the relatively stiff skeleton 12 as the bottom sections thereof are brought together in overlapping relation.

The tubular skeleton 12 is open at its respective ends, each of which terminate short of the adjacent end of the holder. The portions of the core mass 11 projecting beyond the open ends of the skeleton 12 are rounded so as to shape the ends of the holder to a smoothly rounded double curvature similar to the rounded ends of a loaf of bread.

A sheet of glazed tissue paper or the like is wrapped downwardly around the skeleton 12 to form the skin 13, the portions 16 thereof at the ends of the holder being gathered in and tucked beneath the base, using a technique similar to that employed in wrapping parcels in stores. The base panel 14 is then applied over the tucked-in portions 16. The inner face of panel 14 may be coated with adhesive to cause it to adhere to the tucked in end portions 16. The entire wrapping is then secured by the binding 15, wound around the holder diagonally from the top center to the lower corners and diagonally from the bottom center to the upper corners of the holder. The ends of the wire 15 may be secured at the center of the body by twisting them together as at 18.

The stems 17 of flowers can be inserted into the holder simply by punching them through the skin 13, piercing the same, passing through the openings in the mesh of skeleton 12, and between the needles 11.

The ends of the stems in the heart of the mass 11 are held by engagement with the needles 11 against shifting laterally or longitudinally of the holder. Unless a flower is unusually heavy, its stem will be securely positioned by the edge of the skin surrounding the perforation where the stem has pierced the skin, so that each flower will stay exactly in its position assigned to it initially when it is inserted. However, if the weight of an unusually heavy flower would be such as to cause the stem to sag and enlarge the perforations in the skin, the sagging of the stem can proceed only to the point where it comes to rest against one of the wires of the mesh in the skeleton 12. This is true for all flowers inserted in the sides and top of the holder. In the ends of the holder, where there is no wire mesh, the several thicknesses of the skin in the gathered portions thereof will provide ample strength for supporting any flower inserted therethrough without the assistance of the wire mesh of the skeleton.

In the event it is desired to use the holder in a dry spray, the green coloring of the skin 13 will match the color of the flower stems 17 sufficiently to provide a pleasing appearance. On the other hand, if it is desired to use the holder for supporting flowers in a container with the stems immersed in a body of water therein, it is feasible to do so since the water will permeate the holder through the spaces between the gathered portions of the skin 13. Also, where tissue paper is used, the porosity of the paper will permit the water to pass through it.

Because of its inexpensive construction, the holder can be discarded after it has been used. Thus for each new flower arrangement, a fresh holder with an unpierced skin can be employed, the flowers can be inserted through the skin at any selected location and will be held accurately in position by the edges of the skin around the perforation where the stems have pierced the skin.

I claim:

1. In a cut flower holder, a core body comprising a loosely matted mass of dry evergreen needles; a skeleton of wire mesh extending around said core body and supporting the same in a pre-determined cross sectional shape; a skin of thin fibrous sheet material surrounding said skeleton and core body and covering the same; and means securing said skin in said covering relation, said skin, skeleton and core body being adapted to be pierced by the stems of flowers inserted therein through the meshes of said skeleton, and the latter functioning to provide support for flower stems to restrict lateral sagging of the flowers from selected positions of insertion, while the ends of the flower stems are held by their engagement between the needles of said core body.

2. In a cut flower holder; an elongated, loaf shaped core body of dry evergreen needles having a flat bottom; a skeleton of wire mesh wrapped around said core body in the form of an open ended tube extending longitudinally of the core body; a skin of thin tissue paper wrapped around said skeleton and core body and completely covering the same; and means securing said skin in covering relation to said skeleton and core body, said skin, skeleton and core body being adapted to be pierced by the stems of flowers inserted therein, and said skeleton supporting said core body in a pre-determined cross sectional shape and providing support for flower stems to restrict lateral sagging of flowers from selected positions of insertion, while the ends of the flower stems are held by their engagement between the needles of said core body.

3. In a cut flower holder, an elongated core body comprising a loosely matted mass of dried needles of an evergreen tree of the type including pines and firs, said core body having a flat bottom; an open ended tubular skeleton of wire mesh wrapped around said core body and having flat bottom portions in overlapping relation at the bottom of the holder, said core body including rounded end portions projecting beyond the open ends of said skeleton; a skin of tissue paper wrapped around said skeleton and having end portions gathered downwardly around said projecting rounded end portions of the core body and tucked beneath the bottom thereof; a flat bottom panel extending beneath the gathered end portions of the skin in covering relation to the flat bottom of the same; and means securing said bottom panel and skin against one another to retain the skin in snug covering relation to said skeleton and core body, and said skeleton supporting said core body in a pre-determined cross sectional shape and providing support for flower stems to restrict lateral sagging of flowers from selected positions of insertion, while the ends of the flower stems are held by their engagement between the needles of said core body.

4. A flower holder as defined in claim 3, wherein said last means comprises a length of fine wire wound around said skin and bottom panel.

References Cited in the file of this patent

UNITED STATES PATENTS

| 2,113,523 | White | Apr. 5, 1938 |
| 2,699,012 | Boles | Jan. 11, 1955 |

FOREIGN PATENTS

| 526,130 | Germany | June 2, 1931 |